United States Patent
Suwa et al.

(10) Patent No.: US 6,608,926 B1
(45) Date of Patent: Aug. 19, 2003

(54) IMAGE PROCESSING METHOD, IMAGE PROCESSING APPARATUS AND RECORDING MEDIUM

(75) Inventors: Tetsuya Suwa, Kawasaki (JP); Kentaro Yano, Yokohama (JP); Manabu Yamazoe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/337,534

(22) Filed: Jun. 22, 1999

(30) Foreign Application Priority Data

Jun. 24, 1998 (JP) .......................................... 10-177132

(51) Int. Cl.[7] ................................................. G06K 9/00
(52) U.S. Cl. ........................ 382/162; 382/274; 382/169; 358/520; 358/522
(58) Field of Search ................................ 382/162, 164, 382/254, 171, 169, 168, 172, 274, 167; 358/520, 515, 1.9, 518, 504, 521–522; 345/3.15, 589–597; 348/671–673; 347/140

(56) References Cited

U.S. PATENT DOCUMENTS

| 4,717,999 A | 1/1988 | Kaneko .................... 346/160 |
| 4,792,847 A | * 12/1988 | Shimazaki et al. .......... 358/521 |
| 5,450,217 A | * 9/1995 | Eschbach et al. ........... 358/518 |
| 5,467,196 A | 11/1995 | Fukushima et al. ......... 358/298 |
| 5,808,697 A | * 9/1998 | Fujimura et al. ........... 348/672 |
| 6,192,149 B1 | * 2/2001 | Eschbach et al. ........... 382/168 |
| 6,351,558 B1 | * 2/2002 | Kuwata ...................... 382/168 |

FOREIGN PATENT DOCUMENTS

GB        2269958     *  8/1993     ........... G06F/15/68

\* cited by examiner

*Primary Examiner*—Leo Boudreau
*Assistant Examiner*—Ishrat Sherali
(74) *Attorney, Agent, or Firm*—Fitzpatrick, Cella, Harper & Scinto

(57) ABSTRACT

In order to enable satisfactory image processing according to a characteristic of an original image, image data representing an original image is input; it is judged whether or not the value of a saturation component of the image data is larger than a predetermined value; if the value of the saturation component of the image data is larger than the predetermined value, a histogram of the original image is formed except the image data; a color processing condition is set on the basis of the formed histogram; and color processing is performed to the original image on the basis of the set color processing condition.

8 Claims, 11 Drawing Sheets

RED CHARACTERS

IMAGE PROCESSING METHOD, IMAGE PROCESSING APPARATUS AND RECORDING MEDIUM

BACKGROUND OF THE INVENTION

1. Field of the Invention

The present invention relates to image processing method and apparatus for performing color correction according to a histogram of an original image, and to a recording medium in which a program to realize the image processing method has been stored.

2. Related Background Art

As a result of improvement of personal computer performance in recent years, it becomes possible to easily handle even a large-capacity file at high speed. In other words, new users come to handle a photographic natural image to which a large-capacity memory is generally necessary. In addition, since input equipments such as a digital camera, a scanner and the like have been popularized, it becomes possible to digitize various images. A photographic image includes various kinds of images such as a high-quality image taken by a professional photographer, a poor image (i.e., image of which quality is not so high), and the like. In this case, it should be noted that the poor image includes an overexposed image, an underexposed image, a color-fogged image entirely having tint, or the like. Generally, it is thought that the poor image is formed under such a poor photographing condition as a light quantity necessary when the image is taken is inadequate, and the image is taken by using only a fluorescent lamp. Further, it is thought that the poor image is also formed when, e.g., image deterioration is caused in a digitizing process by noise and characteristic of the digital camera. After the poor image is subjected to the digitizing process and then fetched by the personal computer or the like, it is possible to improve the quality of this image by performing necessary correction.

As methods to do so, various correction methods have been proposed. In one of the methods, highlight and shadow points are first determined, and the necessary correction is performed based on the determined points. To perform this method, a histogram of luminance Y of the target image is formed. In this case, the luminance Y is obtained from red (R), green (G) and blue (B) input signal values (each having eight bits) by using a following expression.

$$Y = a \times R + b \times G + c \times B$$

(where a+b+c=1)

According to an NTSC (National Television System Committee) transmission system, the values of the above constants a, b and c are given as 0.3, 0.59 and 0.11, respectively.

The poor image (e.g., underexposed image) generally has such a luminance histogram as shown in FIG. 17. This histogram shows that points to be inherently represented as white points are not actually represented as the white points. Thus, in order to prevent such inconvenience, the luminance at higher several percent of the entire pixels is determined as a highlight point ($Y_{HL}$) and the luminance at lower several percent of the pixels is determined as a shadow point ($Y_{SD}$), as shown in FIG. 17.

Then, an image correction process according to the determined highlight and shadow points is performed to improve the image quality of the underexposed or overexposed image. Such an image quality improvement method has been proposed by the present applicant.

By forming the histogram of the luminance Y of the target image to be corrected and then determining the highlight and shadow points in the histogram for image conversion, it is possible to perform contrast adjustment to improve the quality of the underexposed or overexposed image. Also, it is possible to improve the quality of the color-fogged image.

FIG. 9 shows an example of an image in which an yellow flower image of full image size is taken. The luminance histogram of this example is shown in FIG. 10. That is, the luminance Y of yellow (R=G=255, B=0) has the large value 227. For this reason, as shown in FIG. 9, if the photographic image includes the numerous yellow portions, the highlight point $Y_{HL}$ is forcibly determined at the yellow portion. Thus, there is some fear that the inherently yellow flower is represented as a white flower.

FIG. 11 shows an image in which a white edge is added to the frame of a photograph. Generally, such the image has such a histogram as shown in FIG. 12. That is, since the white edge is included in the image, the pixel is detected at the luminance Y (=255). For this reason, even if this image is poor, an appropriate highlight point can not be determined when the image correction is to be performed, whereby it is impossible to improve the image quality. Similarly, if a black edge is added, since an appropriate shadow point can not be determined, whereby it is impossible to improve the image quality.

FIG. 15 shows an image in which red characters are added to a photograph. In this image, since the character color is red, determination of highlight and shadow points is not so influenced by the characters. However, since all the pixels concerning the original image are converted, photographic portions are improved but the red of the characters included in the photographic portion is changed from its initial state (i.e., original red). Therefore, if a mark (e.g., company logo) of which tint is considered to have an importance is included in the image, a serious problem occurs.

Further, if a graphics image in which photographic portions are extremely small or no photographic portion is included is corrected in the same manner as for the photograph, there is some fear that its image quality is deteriorated.

SUMMARY OF THE INVENTION

The present invention has been made to solve the above conventional problems, and an object thereof is to enable satisfactory color processing according to a characteristic of an original image.

An object of the first invention is to be able to set a satisfactory color processing condition even if an original image includes a high-luminance color having a tint included in the original image.

In order to achieve the above object, there is provided an image processing method comprising the steps of:

inputting image data representing an original image;

judging whether or not the value of a saturation component of the image data is larger than a predetermined value;

forming, if the value of the saturation component of the image data is larger than the predetermined value, a histogram of the original image except the image data;

setting a color processing condition on the basis of the formed histogram; and performing color processing to the original image on the basis of the set color processing condition.

An object of the second invention is to be able to set a color processing condition suitable for an original image even if a portion such as an edge of the original image other than an image portion is included in the original image.

In order to achieve the above object, there is provided an image processing method comprising the steps of:

inputting image data representing an original image;

judging whether or not the same image data are successive in a predetermined number;

forming, if the same image data are successive in the predetermined number, a histogram of the original image except the image data;

setting a color processing condition on the basis of the formed histogram; and performing color processing to the original image on the basis of the set color processing condition.

An object of the third invention is to faithfully reproduce a specific color included in an original and also satisfactorily reproduce an image portion of the original image.

In order to achieve the above object, there is provided an image processing method comprising the steps of:

inputting a user's instruction representing an arbitrary color;

forming a histogram representing a color other than the color according to the user's instruction, on the basis of image data included in an original image;

setting a color processing condition on the basis of the formed histogram; and performing color processing based on the set color processing condition, to the original image.

An object of the fourth invention is not to perform, to a graphic image, color processing according to color distribution of an original image.

In order to achieve the above object, there is provided an image processing method for inputting image data representing an original image, and performing color processing according to color distribution of the original image, said method comprising the steps of:

judging whether or not the same image data are successive in a predetermined number; and controlling the color processing in accordance with the number of pixels of the image data being successive in the predetermined number in the original image.

Other objects, advantages and salient features of the present invention will become apparent from the detailed description which, takes in conjunction with the annexed drawings, disclose the preferred embodiments of the present invention.

DETAILED DESCRIPTION OF PREFERRED EMBODIMENTS

First Embodiment

Hereinafter, the embodiment of the present invention will be explained in detail with reference to the annexed drawings.

Figure 1:
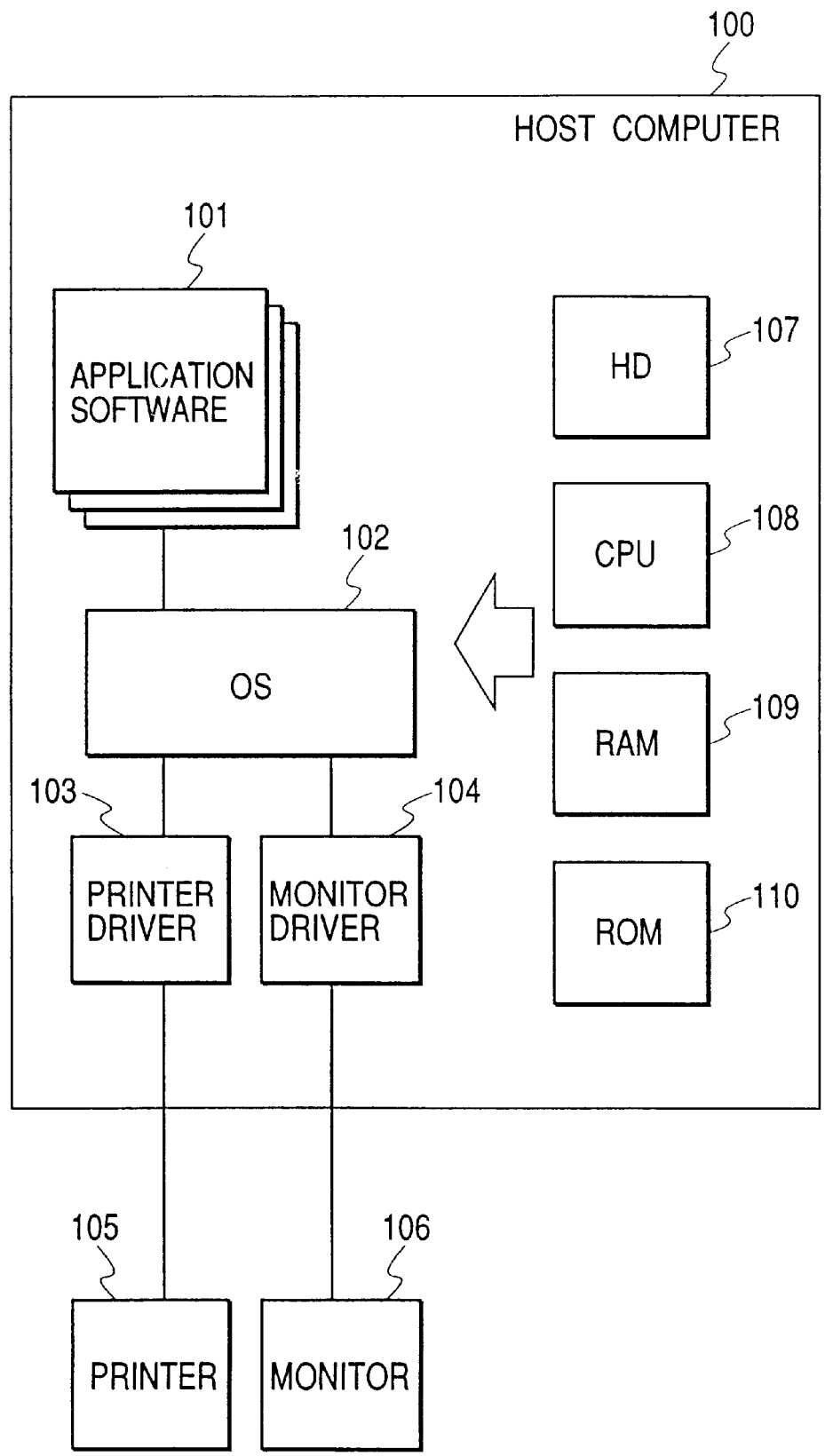
FIG. 1 is a block diagram showing an example of a system structure.

FIG. 1 shows an example of a system outline according to the present embodiment. A host computer 100 is connected with a printer 105 such as an inkjet printer or the like and also connected to a monitor 106. Further, the host computer 100 has application software (referred as application hereinafter) 101 such as a word processor, a spreadsheet and an Internet browser, an OS (operating system) 102, a printer driver (software) 103 to process various drawing instruction groups (including image drawing instruction, text drawing instruction and graphics drawing instruction) concerning an output image and issued by the applications for the OS 102 to generate printing data, and a monitor driver (software) 104 to process the various drawing instruction groups issued by the applications to display the processed results on the monitor 106.

Further, the host computer 100 contains hardware by which the software can be executed. For example, the host computer 100 contains a CPU (central processing unit) 108, an HD (hard disk driver) 107, a RAM (random access memory) 109, a ROM (read-only memory) 110, and the like.

As the embodiment in FIG. 1, for example, it is thought that the Microsoft Windows 95 is used as the OS in an IBM-compatible personal computer, an arbitrary application printable is installed in the computer, and the monitor and the printer are connected to the computer.

On the basis of the image displayed on the monitor 106, the host computer 100 generates output image data by using text data classified in a text such as a character or the like, graphic data classified in graphics such as a figure or the like and image data classified in an image of nature, or the like, on the basis of the application 101. When host computer 100 outputs and prints the image data, the application 101 issues a printing output request to the OS 102. Then the application

101 issues to the OS 102 a drawing instruction group which represents the output image consisting of the graphic data portion (graphic drawing instruction) and the image data portion (image drawing instruction). When the OS 102 receives the printing output request from the application 100, it issues the drawing instruction group to the printer driver 103 corresponding to the output printer. The printer driver 103 processes the printing request and the drawing instruction group input from the OS 102 to generate the printing data printable by the printer 105, and then transfers the generated data to the printer 105. If the printer 105 is a laster printer, the printer driver 103 sequentially performs image correction processes to the drawing instructions sent from the OS 102 and sequentially rasterizes the processed data into an RGB (red, green, blue) 24-bit page memory. After the printer driver 103 rasterizes all the drawing instructions, it converts the contents of the RGB 24-bit page memory into, e.g., C (cyan), M (magenta), Y (yellow) and K (black) data of the data format printable by the printer 105.

Figure 2:
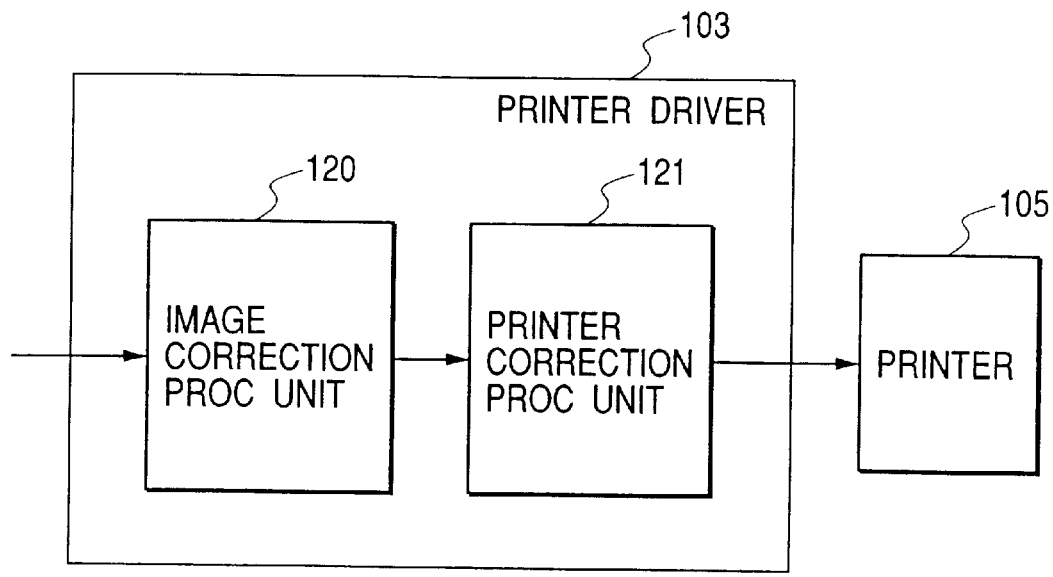
FIG. 2 is a block diagram for explaining a process in a printer driver.

Subsequently, the process to be performed by the printer driver 103 will be explained with reference to FIG. 2.

The printer driver 103 performs the later-described image correction process to color information included in the drawing instruction group sent from the OS 102, by using an image correction process unit 120. Then a correction process unit 121 for the printer (referred as printer correction process unit 121 hereinafter) initially rasterizes the drawing instruction on the basis of the color information subjected to the image correction process, and generates a raster image on the RGB 24-bit page memory. Then the driver 103 performs a masking process, a gamma correction process, a quantization process and the like to each pixel in accordance with the color reproduction gamut of the printer, generates the C, M, Y and K data depending on a printer characteristic, and transfers the generated data to the printer 105.

Figure 3:
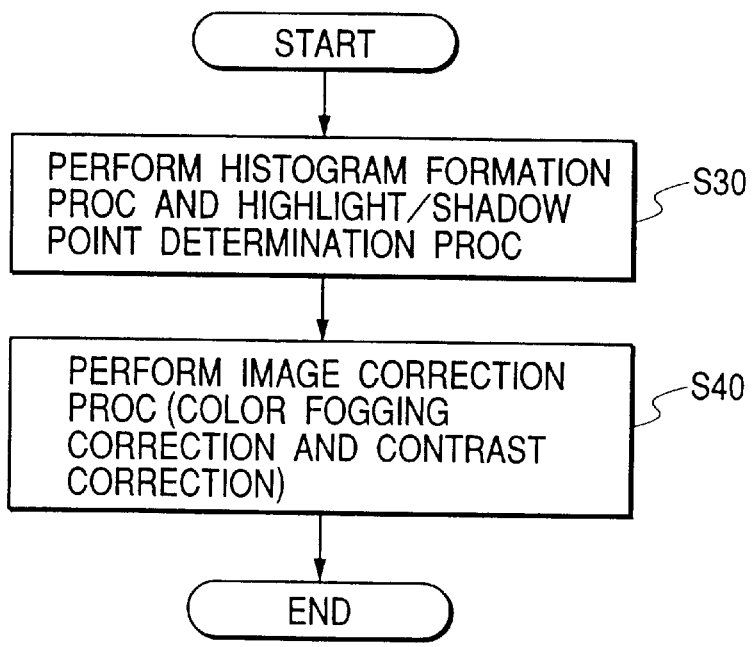
FIG. 3 is a flow chart for explaining a process performed in an image correction process unit.

Subsequently, the process to be performed in the image correction process unit 120 will be explained with reference to FIG. 3.

The image correction process in the present embodiment is performed to the original image represented by the image drawing instruction, but is not performed to the original image represented by a graphic drawing instruction or a text drawing instruction. Further, as the image correction process, a histogram formation process (step S30 in FIG. 3) and an image correction process (step S40 in FIG. 3) according to a formed histogram are performed.

Figure 4:
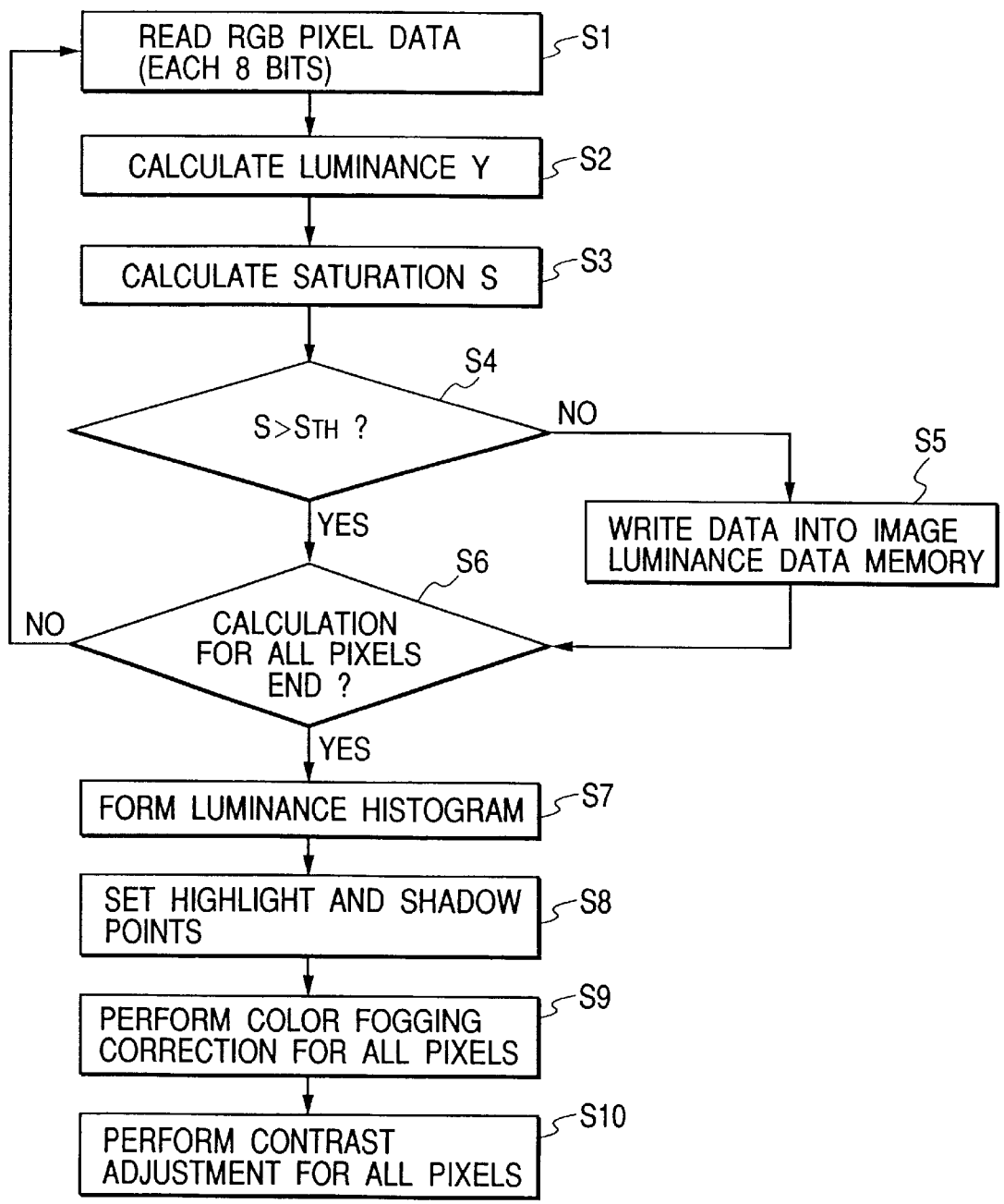
FIG. 4 is a flow chart showing processes in an image correction method taking saturation into consideration.

In the step S30, the histogram is formed to the original image represented by the image drawing instruction (steps S1 to S7 in FIG. 4), and a highlight point and a shadow point of the original are determined on the basis of the formed histogram (step S8 in FIG. 4).

Subsequently, in the step S40, the image correction process based on the highlight and shadow points determined in the step S30 is performed. In the present embodiment, color fogging correction (step S9 in FIG. 4) to correct color fogging of the original image and exposure correction (or contrast correction) (step S10 in FIG. 4) to correct luminance contrast to optimize exposure of the original image are performed as the image correction process.

Hereinafter, the histogram formation process and the image correction process in the present embodiment will be explained with reference to FIG. 4.

In the present embodiment, in order to prevent that yellow portions in the high-luminance yellowish image (i.e., having numerous yellow portions) are unnecessarily changed into white portions through the image correction, the color fogging correction and the contrast correction are performed on the basis of the luminance histogram formed in consideration of saturation.

That is, R, G and B pixel data (each having eight-bit value) of the original image represented by the image drawing instruction are read (step S1).

Then a process represented by a following expression is performed on the basis of the read pixel data, thereby obtaining luminance Y (step S2).

$$Y=0.3 \times R+0.59 \times G+0.11 \times B$$

Then saturation S of the read pixel data is obtained (step S3). By using color difference signals ($C_1$, $C_2$), the saturation S is defined by using a following expression.

$$S=(C_1^2+C_2^2)^{1/2}$$

In this case, the color difference signals are defined by using following expressions.

$$C_1=R-Y$$

$$C_2=B-Y$$

By such the processes, the luminance Y and the saturation S of the read pixel are calculated.

Subsequently, the calculated saturation S is compared with a threshold value $S_{TH}$ of preset saturation (step S4).

If $S \leq S_{TH}$, the obtained data (i.e., compared result) is written into an image luminance data memory (step S5).

On the other hand, if $S > S_{TH}$, since the read pixel is considered as the pixel corresponding to the yellow flower portion, the obtained data is not written into the image luminance data memory.

Figure 5:
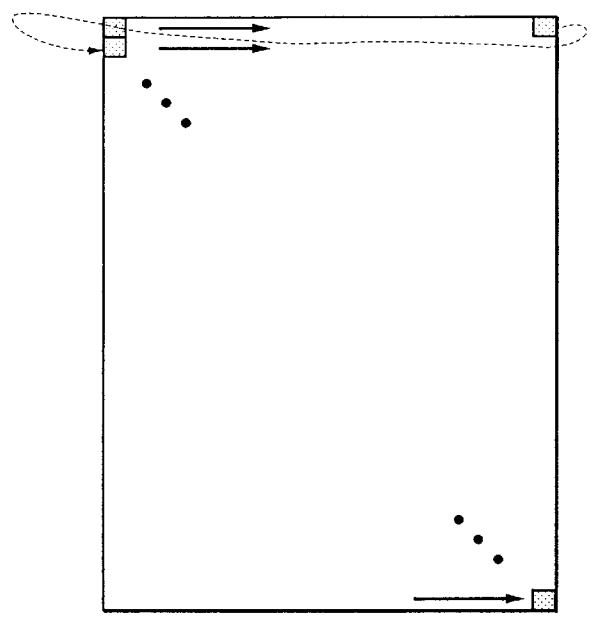
FIG. 5 is a view showing a scan direction in case of reading pixels.

As shown in FIG. 5, the image data is read in a raster direction from the start point at the upper left of the image, and the above processes are repeated. Thus, it is possible to perform the luminance calculation and the saturation judgment (or discrimination) for all the pixels in the image, and also to store the obtained results in the image luminance data memory (step S6).

Then, by using the data stored in the image luminance data memory, luminance histograms for the pixels of which saturation is smaller than the threshold value $S_{TH}$ are formed (step S7).

Subsequently, the luminance at the predetermined number of pixels from the top (highlight) of this histogram is set as the highlight point and the luminance at the predetermined number of pixels from the bottom (shadow) is set as the shadow point (step S8).

$$Y_{HL}=Y_{255}, \text{ (where } Y_{255}=255\text{)}$$

$$Y_{SD}=Y_0, \text{ (where } Y_0=0\text{)}$$

After the highlight and shadow points are determined, the color fogging correction is performed (step S9). Initially, the average values ($C_1$(HL), $C_2$(HL)) and ($C_1$(SD), $C_2$(SD)) of the color difference signals of the pixels having the luminance of the determined highlight point and the luminance of the determined shadow point are obtained from the image luminance data memory.

Figure 9:
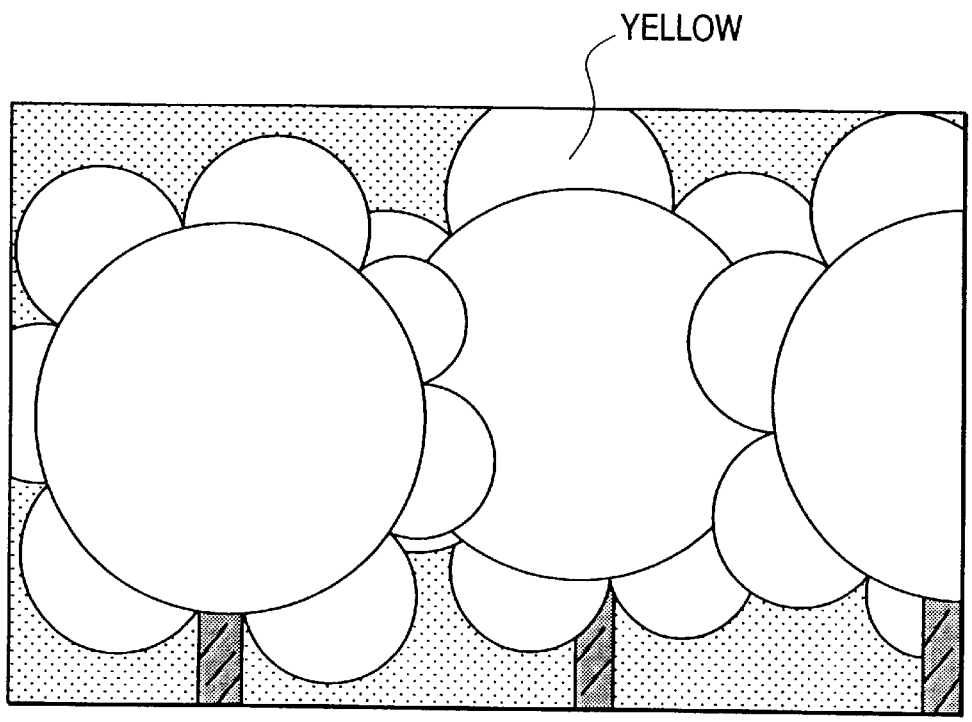
FIG. 9 is a view showing an example of an image which includes numerous yellow portions.
Figure 10:
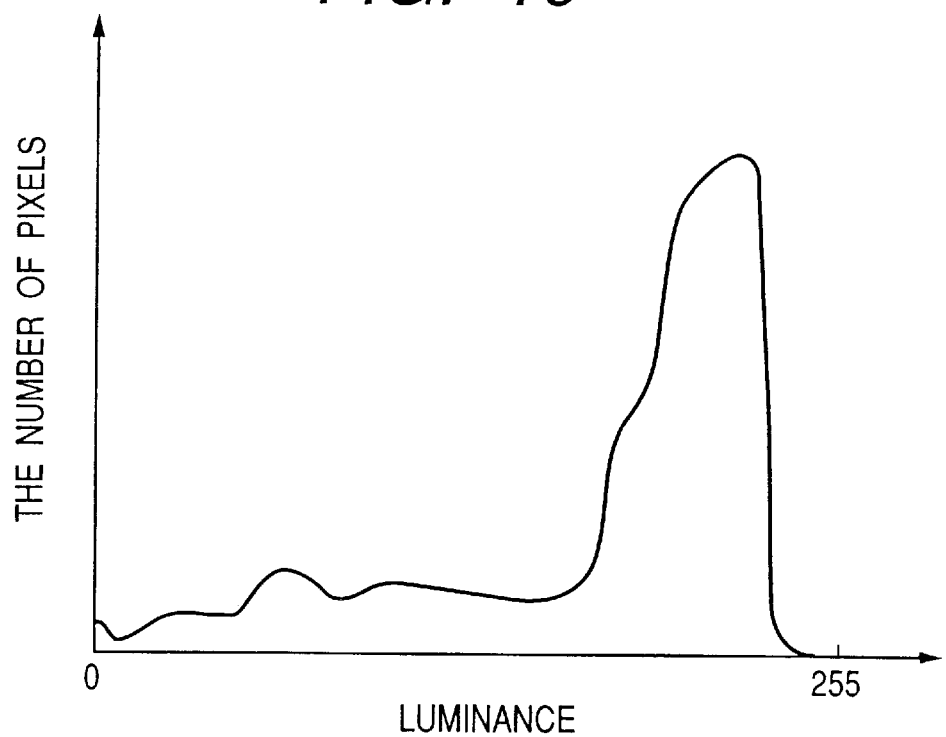
FIG. 10 is a view showing an example of a luminance histogram of the image including the numerous yellow portions.

The remarkable point in this case is to obtain the average value of the color difference signals from only the pixels of which saturation is equal to or smaller than the set value $S_{TH}$. That is, in a case where color aberration from inherent white and black points which is caused by the color fogging is calculated in the original image, it is possible to accurately estimate the color aberration by eliminating the pixel data of high-luminance color (e.g., yellow in FIG. 9).

Figure 6A:
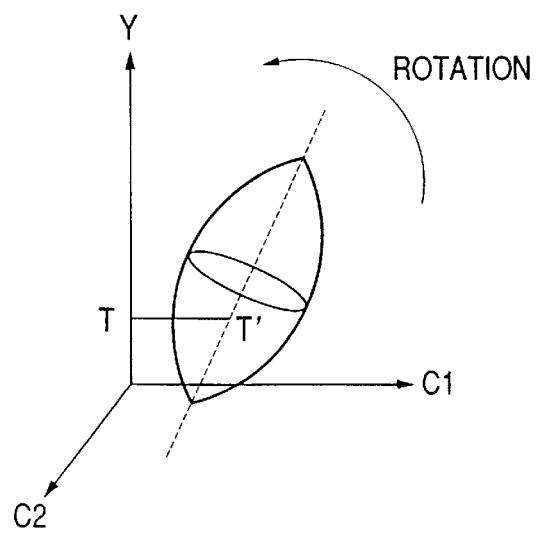
FIGS. 6A and 6B are views for explaining color fogging correction.
Figure 6B:
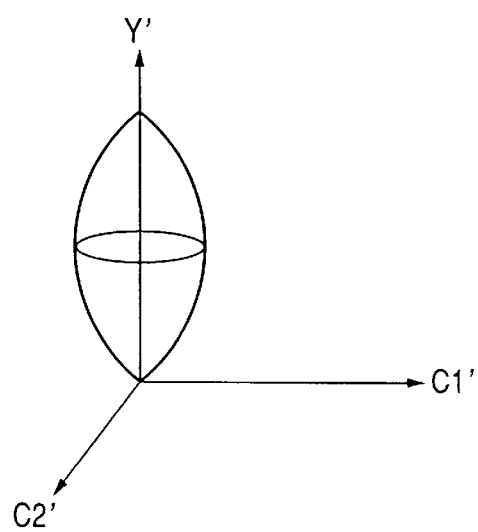

As shown in FIG. 6A, if the color fogging occurs, a line (color solid axis) connecting the obtained average values ($C_1$(HL), $C_2$(HL)) and ($C_1$(SD), $C_2$(SD)) is inclined from a luminance axis. Therefore, as shown in FIG. 6B, a conversion process is performed such that the inclined color solid axis overlaps the luminance axis (step S10).

According to the color fogging correction in the present embodiment, the color solid of the original image is rotated around the shadow point (acting as rotation center) on the color solid axis and around the color solid axis (acting as rotation axis), such that the color solid axis is parallel with the luminance axis. Then, the color solid is parallelly moved such that the position of the shadow point overlaps the luminance axis.

In this case, a rotation matrix is obtained on the basis of the rotation axis and angle obtained from the values ($C_1$(HL), $C_2$(HL)) and ($C_1$(SD), $C_2$(SD)).

As above, each pixel of the original image is converted into the luminance and color difference signals, and the obtained signals are subjected to the rotation and the parallel movement conversion in a three-dimensional color space, thereby performing the, color fogging correction.

Figure 7:
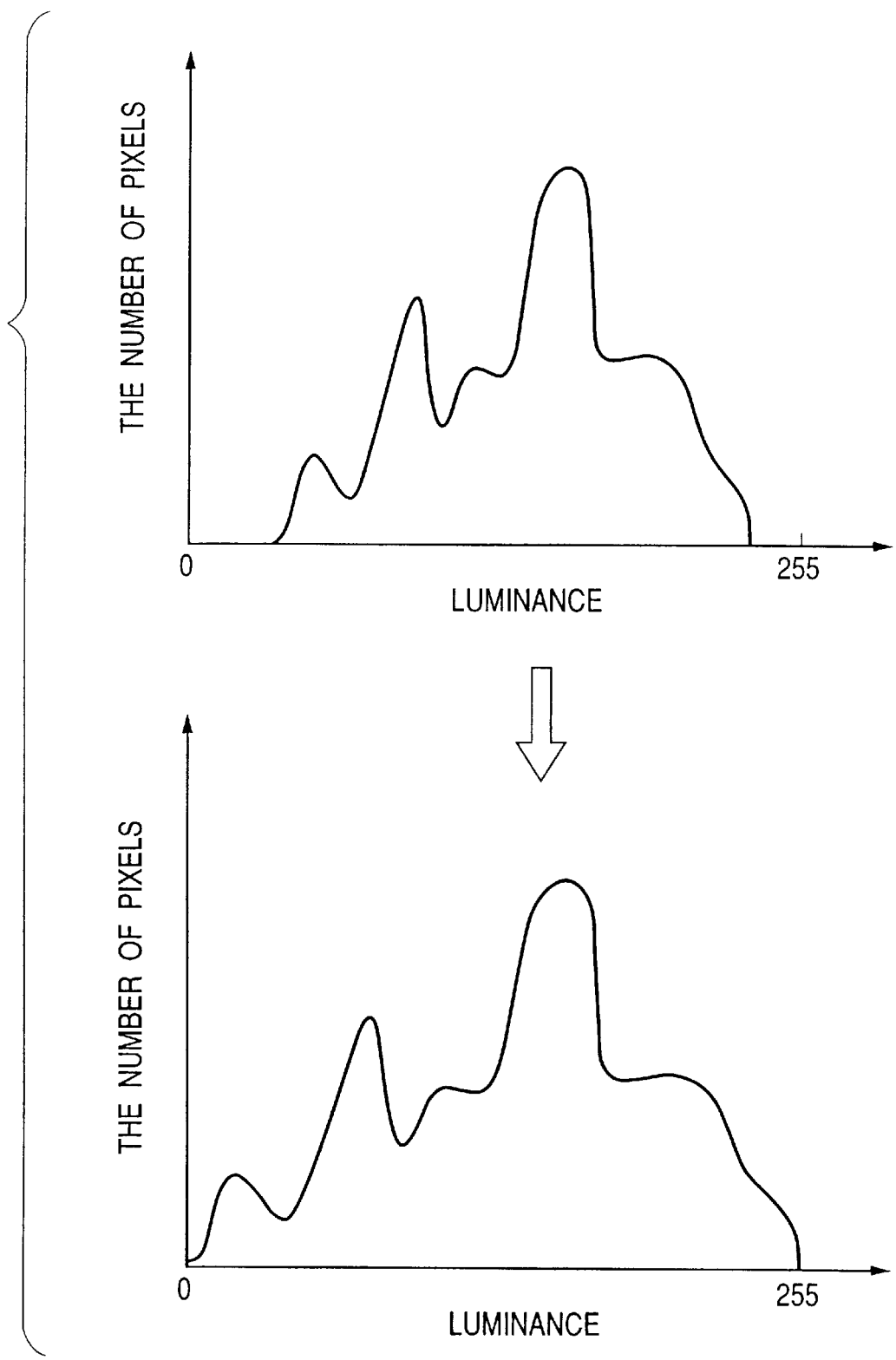
FIG. 7 is a view showing a luminance expansion method to be performed in contrast adjustment.

After the color fogging correction is performed, the contrast adjustment to correct underexposure and overexposure is performed (step S10). As shown in FIG. 7, after the highlight and shadow points are determined, the conversion to distribute the luminance to an entire luminance area is performed to all the pixels of the image.

In the present embodiment, the overexposure and the underexposure are easily judged. Then, in accordance with the judged result, gamma correction is performed to the luminance signal, thereby performing the contrast correction.

The contrast correction is performed by using a one-dimensional LUT (look-up table) in which input luminance values 0 to 255 are converted into output luminance values 0 to 255. In the present embodiment, the LUT can be expressed as two straight lines connecting a luminance value "Yk" of a black position (shadow point) with a luminance value "Yw" of a white position (white point) through a luminance value "T'" at an inflection point between the black and white positions (see FIG. 8).

In the present embodiment, the luminance value "Yk" at the black position is converted into the value "10", and the luminance value "Yw" at the white position is converted into the value "245". Further, the luminance value "T'" at the inflection point is defined and converted in the following manner. That is, if the luminance value corresponding to the minimum distance between the color solid axis before the color fogging correction and an Y axis (luminance axis) is defined as "T", the difference between the luminance value "T" and the minimum luminance value of the color solid of the original image is defined as the luminance value "T'" at the inflection point. Then, the luminance value "T'" is converted into the luminance value "T'".

Figure 8:
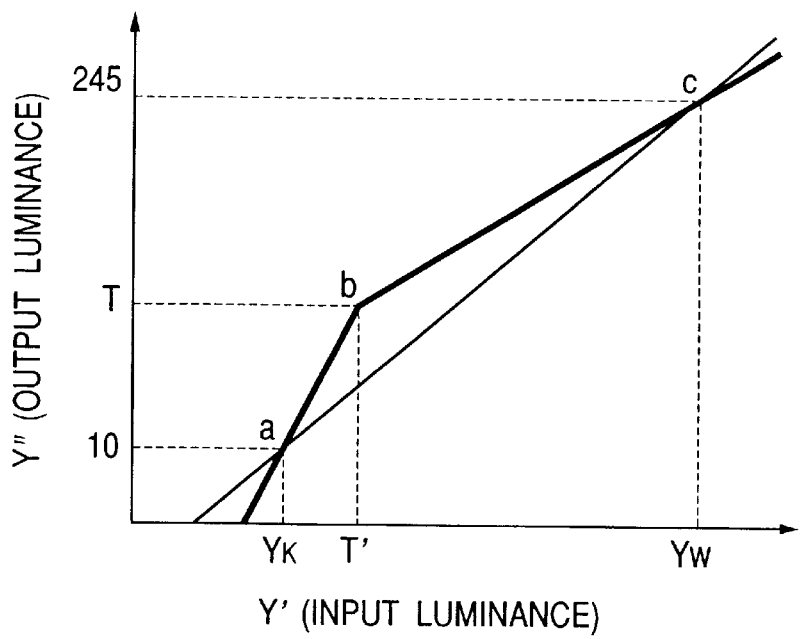
FIG. 8 is a view for explaining the contrast adjustment.

That is, as shown in FIG. 8, the luminance value "Yk" at the black position is converted into the value "10" ("a" point), the luminance value "T'" at the inflection point is converted into the luminance value "T" ("b" point), and the luminance value "Yw" at the white position is converted into the luminance value "245" ("c" point). As shown by the fat line in FIG. 8, other luminance values in the original image are respectively converted along the straight lines connecting the points "a" and "c" through the point "b".

Further, it is also possible to perform the saturation correction in such a manner as follows. That is, for chromaticity C1 and C2 of each original pixel, $$C1''=n \times C1'$$

$$C2''=n \times C2'$$

(where n is saturation coefficient)

In this case, it is possible to easily perform the saturation correction by adjusting the saturation coefficient "n".

At this time, each pixel of the original image is in the state that the (R, G, B) color signal data have been converted into (Y", C1", C2") color space data. Therefore, the color space data is inversely converted into the (R', G', B') color signal data. Such the inversive conversion is performed by following expressions.

$$R'=Y''+C1''$$

$$G'=Y''-(0.3/0.59) \times C1''-(0.11/0.59) \times C2''$$

$$B'=Y''+C2''$$

By performing the correction taking the saturation into consideration, it is possible to perform the appropriate process even for the image including the numerous high-luminance yellow portions, thereby improving the quality of the image.

Second Embodiment

Figure 11:
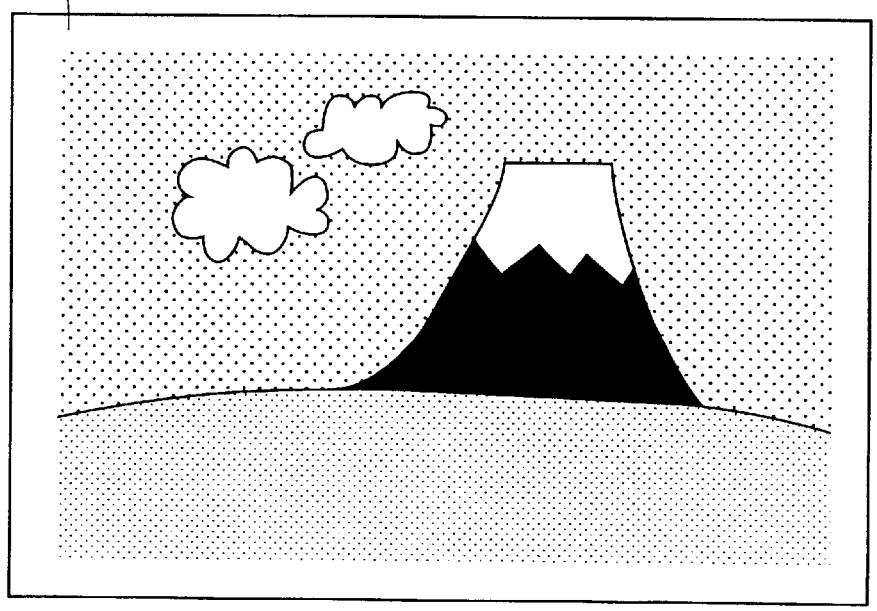
FIG. 11 is a view showing an example of an image in which a white edge is added to a photograph.
Figure 12:
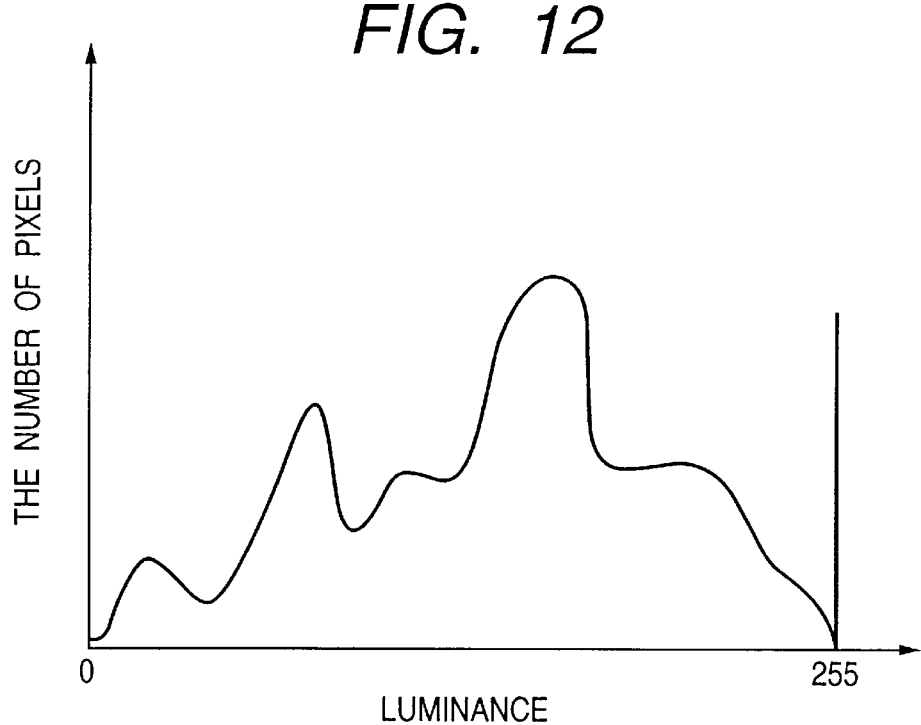
FIG. 12 is a view showing an example of a luminance histogram of the image in which the white edge is added to the photograph.

In the second embodiment, an image correction process is not performed to an original image such as a graph including numerous successive signal values such that appropriate correction is performed to such an image as shown in FIG. 11 in which a white edge is added to a photograph. Hereinafter, the image correction process according to the second embodiment will be explained.

It should be noted that, by applying the image correction process in the second embodiment to the image correction process in the first embodiment, the image correction process is applicable to the printing process in the same manner as that in the first embodiment.

Figure 13:
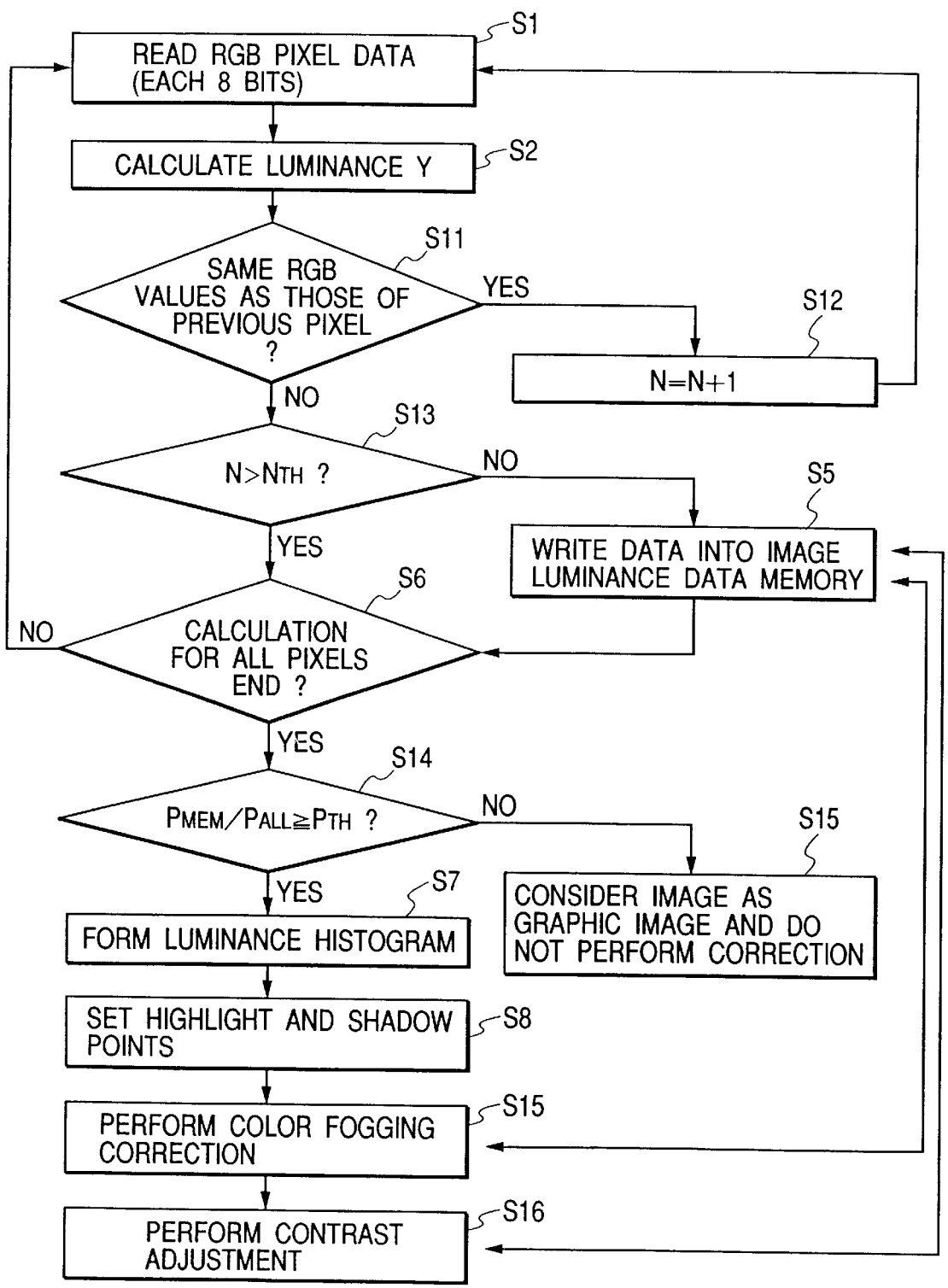
FIG. 13 is a flow chart showing processes in which successive data are detected and then image correction is performed.

FIG. 13 is a flow chart showing a histogram formation process according to the second embodiment. In this process, image data is first read and a luminance histogram is formed.

In the flow chart shown in FIG. 13, it should be noted that the same process as that to be performed in the histogram process of the first embodiment shown in FIG. 4 is added with the same reference numeral.

Initially, the original image represented by the image drawing instruction is scanned in the raster direction shown in FIG. 5 to sequentially read R, G and B pixel data (each eight bits), and the read data are then converted into luminance data (steps S1 and S2).

Then it is judged whether or not the input pixel data has the pixel signal value (RGB value) same as that of the previous pixel data (step S11). If judged in the step S11 that the pixel data having the same pixel signal value are successive (i.e., input pixel data has the value same as that of previous pixel data), then the number of the pixels having the same value are counted as N (number) (step S12).

If judged in the step S11 that the input pixel data has the pixel signal value different from that of the previous pixel data, then it is judged whether or not the value of N is larger than the value of preset $N_{TH}$ (step S13).

If $N>N_{TH}$ is satisfied, the successive data are considered as the edge portion in the image, and the N pixels are not written into an image luminance data memory.

On the other hand, if $N>N_{TH}$ is not satisfied, the N pixels are written into the image luminance data memory (step S5).

In the present embodiment, the value of $N_{TH}$ is assumed to be 50.

As shown in FIG. 5, the image data is then read in the raster direction from the start point at the upper left of the image, and the above processes are repeated. By doing so, it is possible to perform luminance calculation and successive pixel judgement (or discrimination) for all the pixels, and also it is possible to store the obtained results in the image luminance data memory (step S6).

Thus, it is possible to prevent that the pixel data concerning the edge portion of the original image is stored in the image luminance data memory, whereby it is possible to form the histogram of the image portion in the original image.

In a case where it is assumed that the number of all the pixels is $P_{ALL}$ and the number of the pixels written into the image luminance data memory is $P_{MEM}$, if $P_{MEM}/P_{ALL} < P_{TH}$ is satisfied, since almost all the pixel data represent the graphic image of the successive data, any correction is not performed (steps S14 and S15). Here, the left term $P_{MEM}/P_{ALL}$ of the above expression represents a rate of the image area considered as the image portion of the original image, and the right term $P_{TH}$ represents the threshold value used to judge whether or not the target image is the graphic image and has the value within the range from 0 and 1. Ordinarily, the threshold value $P_{TH}$ is about 0.3 to 0.5, and it is assumed in the present embodiment that the value $P_{HEM}$ is 0.5.

By the above process, it is possible to prevent that the graphic image represented by the image drawing instruction is subjected to the image correction process.

If judged in the step S14 that the target image corresponds to the image portion (or target image is picture image), the luminance histogram is formed on the basis of the pixel data stored in the image luminance data memory (step S7).

This histogram represents luminance distribution of the image portion other than the edge in the original image.

Figure 14:
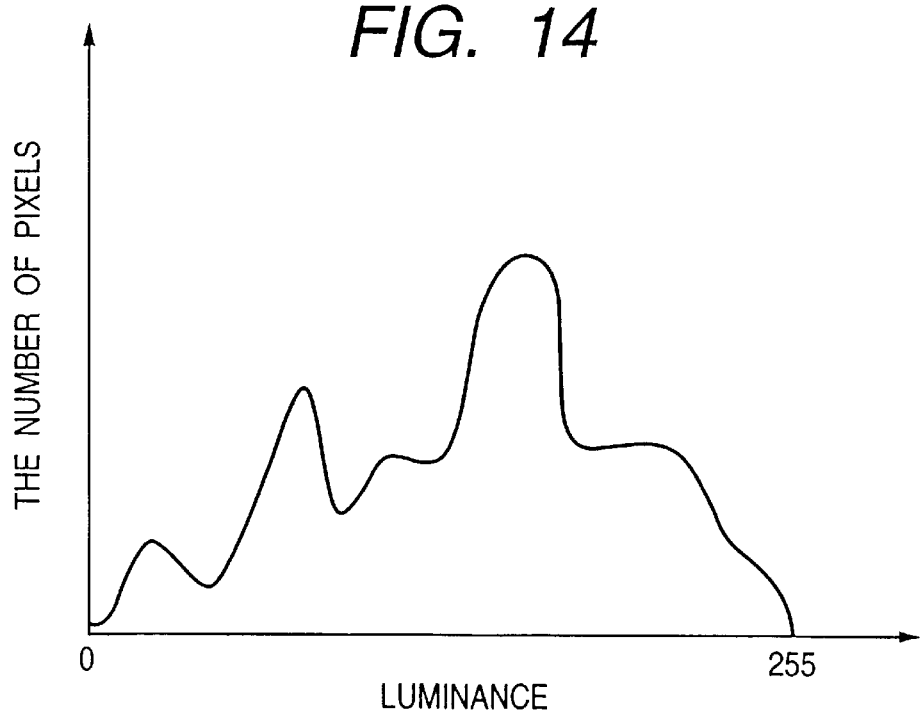
FIG. 14 is a view showing a luminance histogram formed after pixel data of the white edge are removed.

FIG. 14 shows a luminance histogram obtained by the above process performed to the image shown in FIG. 11. As a result of comparison of this luminance histogram with the luminance histogram of the original image, it is apparent that there is no peak at the luminance Y (=255) representing white.

As above, since it is possible to form the luminance histogram of the image portion in the original image, it is possible to determine the appropriate highlight and shadow points from the luminance histogram (step S8).

After then, color fogging correction (step S15) and contrast adjustment (step S16) are performed only to the pixel data stored in the image luminance data memory, in the same manner as that in the first embodiment.

As above, by processing only the pixel data stored in the image luminance data memory, it is possible not to perform the correction to the edge of the original image. As a result, it is possible to satisfactorily reproduce, in the output image, the color of such the edge of the original image.

For example, when the image shown in FIG. 11 is processed, the edge color (white) is reproduced as it is. On the other hand, the image surrounded with such the edge is corrected to have satisfactory image quality.

In FIG. 11, although the white edge is shown by way of example, the present embodiment is not limited to this. Namely, the present embodiment is applicable for an edge of any color. Further, the scan direction is not limited to the raster direction. Namely, the same correction is possible even in a column direction. Further, although the value of $N_{TH}$ for judging the successive data is assumed as 50 in the present embodiment, but such the value is not limited to this. Namely, various value is applicable.

Further, it is possible to automatically set the value of $N_{TH}$ according to the number of pixels of the original image which can be recognized from the header portion of the image drawing instruction.

For example, the number of pixels of the original image is obtained on the basis of the height and width described at the header portion, whereby it is possible to automatically set the value of $N_{TH}$ on the basis of the result obtained by multiplying the number of pixels and a predetermined coefficient together.

By doing so, it is possible to improve accuracy in the judgment of the edge portion of the original image.

Third Embodiment

Figure 15:
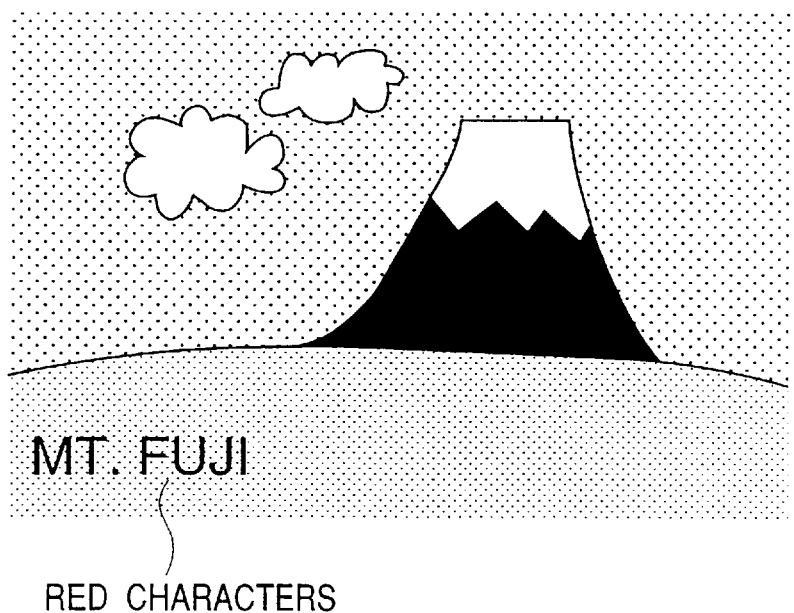
FIG. 15 is a view showing an example of an image in which red characters are included in a photograph.
Figure 17:
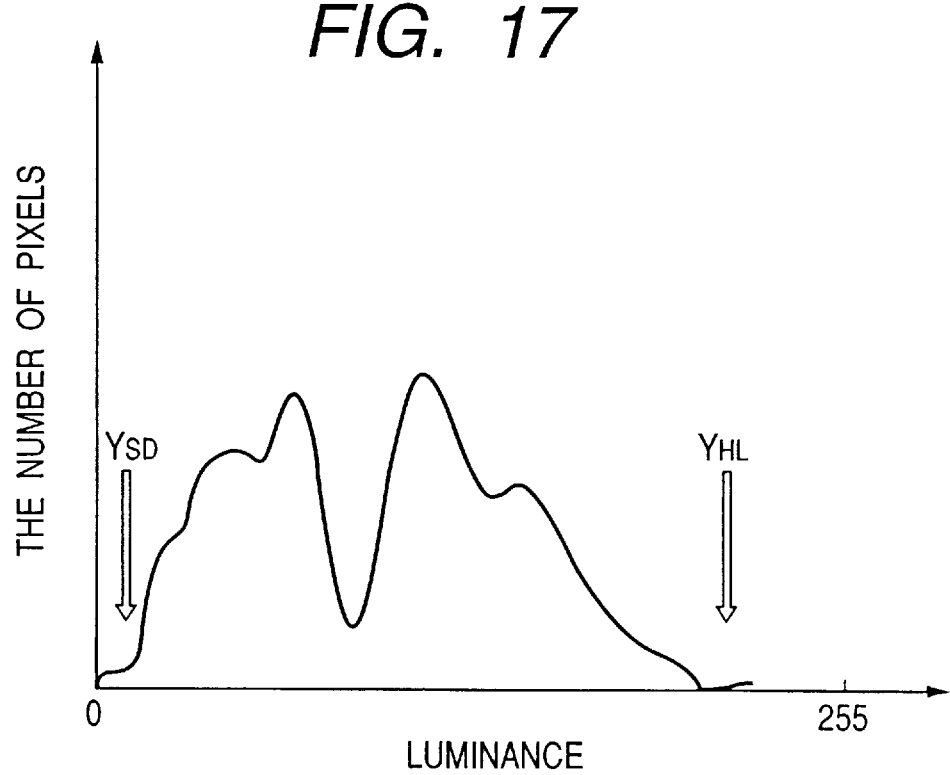
FIG. 17 is a flow chart showing an example of a luminance histogram of an underexposed image.

In the third embodiment, it will be explained a method to handle such an image as shown in FIG. 15 in which color characters are added to a photograph. In this method, after the signal value of a character pixel is eliminated, a luminance histogram is formed, and color fogging correction and contrast adjustment are then performed on the basis of the formed histogram.

It should be noted that, by applying the image correction process in the third embodiment to the image correction process in the first embodiment, the image correction process in the present embodiment is applicable to printing process in the same manner as that in the first embodiment.

Figure 16:
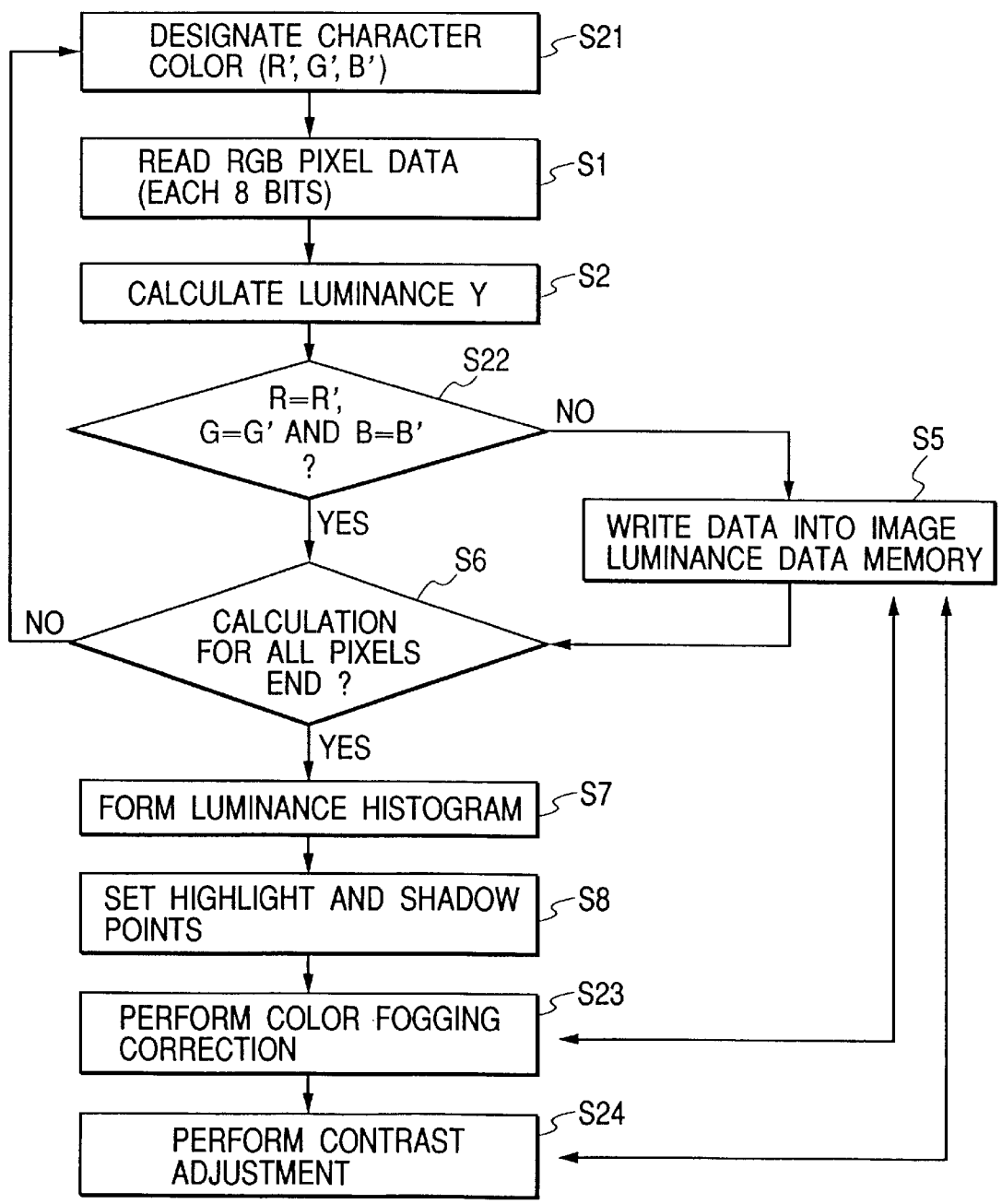
FIG. 16 is a flow chart showing processes in which a user performs color designation and then image correction is performed.

FIG. 16 is a flow chart showing the process according to the third embodiment. In this process, a user himself initially designates color (R', G', B') of the character (step S21). As a color designation method, a method to directly input the signal value by the user, or a method to display an original image and to designate the color of the character portion on the displayed image by the user with use of a mouse or the like is applicable.

After then, pixel data is read and converted into luminance data to form the luminance histogram (steps S1 and S2).

If the input pixel data satisfies R=R' and G=G' and B=B', since the pixel data is considered as the data representing the character portion, such the data is not stored in an image luminance data memory (step S22).

If the input pixel data does not coincide with the designated character color, since the data is considered as the data representing an image data portion in the original image, such the data is written into the image luminance data memory (step S5).

By performing the above process to all the pixels representing the original image (step S6), the luminance histogram of the portion other than the color character portion in the original image is formed (step S7).

Then highlight and shadow points are determined from the formed luminance histogram (step S8).

Color fogging correction (step S23) and contrast adjustment (step S24) are performed only to the pixel data stored in the image luminance data memory, in the same manner as that in the first embodiment.

As above, by processing only the pixel data stored in the image luminance data memory, it is possible not to perform the correction to the color character portion of the original image. As a result, it is possible to perform the image correction to the image portion to improve its image quality but not to change a tint of the character.

In the present embodiment, the character has been explained by way of example. However, the present embodiment is also applicable to overall objects such as some mark, some logo and the like.

Further, in the present embodiment, the monochrome character has been explained by way of example. However, it is possible to select plural colors and not to change them. In this case, the user designates the plural colors in the step S21, and the input pixel data is compared with the plural colors in the step S22.

Other Embodiments

In the image correction process of the above embodiments, the color fogging correction is first performed and then the contrast adjustment to correct underexposure or overexposure is performed. However, the order of these processes may be vice versa. Further, algorithm of highlight/shadow point determination, histogram formation and image correction is not limited to that in the above-described methods, but various methods may be used. For example, a histogram may be formed not based on the luminance but based on another component such as lightness or the like representing brightness.

Further, it is possible to combine the first, second and third embodiments to achieve the objects of the present invention.

Further, the present invention includes a case where program codes of software for realizing the functions of the above embodiments are supplied to a computer provided in an apparatus connected to various devices or a system so as to operate the various devices or the system, and thus the various devices or the system are operated according to the program codes stored in the computer (CPU or MPU).

In this case, the program codes themselves realize the functions of the above embodiments. Therefore, the program codes themselves and a means (e.g., storage (or recording) medium storing program codes) for supplying the program codes to the computer constitute the present invention.

As the storage medium for storing the program codes, e.g., a floppy disk, a hard disk, an optical disk, a magnetooptical disk, a CD-ROM, a magnetic tape, a non-volatile memory card, a ROM and the like can be used.

Further, it can be obviously understood that the present invention includes not only a case where the computer executes the supplied program codes to realize the functions of the above embodiments, but also a case where the program codes cooperate with an OS (operating system) running on the computer or another application software to realize the functions of the above embodiments.

Further, it can be obviously understood that the present invention also includes a case where, after the supplied program codes are stored in a memory provided in a function expansion board of the computer or a function expansion unit connected to the computer, a CPU or the like provided in the function expansion board or the function expansion unit performs a part or all of the actual processes on the basis of the instructions of the program codes, and thus the functions of the above embodiments are realized by such the processes.

As many apparently widely different embodiments of the present invention can be made without departing from the spirit and scope thereof, it is to be understood that the present invention is not limited to the specific embodiments thereof expect as defined in the appended claims.

What is claimed is:

1. An image processing method comprising the steps of:

inputting image data representing an original image;

judging whether or not the value of a saturation component of the image data is larger than a predetermined value;

forming a histogram of the original image data except when it is judged that the saturation component of the image data is larger than the predetermined value; and performing color processing to the original image data by using the color processing condition obtained from the histogram formed in said forming step.

2. A method according to claim 1, wherein the histogram is formed on the basis of a color component representing brightness.

3. A method according to claim 1, wherein the color processing based on the color processing condition is performed to the unexcepted image data.

4. A method according to claim 1, further comprising the step of judging whether or not the original image is a picture image, and wherein, if the original image is the picture image, the color processing is performed.

5. A method according to claim 4, wherein it is judged whether or not the original image is the picture image, on the basis of a drawing function representing the original image.

6. An image processing apparatus comprising:

an input unit adapted to input image data representing an original image;

a judgment unit adapted to judge whether or not the value of a saturation component of the image data is larger than a predetermined value;

a formation unit adapted to form a histogram of the original image data except when it is judged that the saturation component of the image data is larger than the predetermined value; and a color processing unit adapted to perform color processing to the original image data by using the color processing condition obtained from the histogram formed by said forming unit.

7. A recording medium for recording a computer-readable program to execute an image processing method comprising the step of:

inputting image data representing an original image;

judging whether or not the value of a saturation component of the image data is larger than a predetermined value;

forming a histogram of the original image data except when it is judged that the saturation component of the image data is larger than the predetermined value; and performing color processing to the original image data by using the color processing condition obtained from the histogram formed in said forming step.

8. A method according to claim 1, wherein the color processing includes color fogging correction and contrast adjustment, the correction condition for the color fogging correction is a rotation matrix obtained from highlight and shadow image data obtained from the histogram, and the correction condition for the contrast adjustment is gamma correction.

* * * * *

UNITED STATES PATENT AND TRADEMARK OFFICE
CERTIFICATE OF CORRECTION

PATENT NO. : 6,608,926 B1
DATED : August 19, 2003
INVENTOR(S) : Tetsuya Suwa et al.

It is certified that error appears in the above-identified patent and that said Letters Patent is hereby corrected as shown below:

Column 1,
Line 45, "a" should read -- the --;
Line 60, "$Y_{IIL}$" should read -- $Y_{HL}$ --.

Column 2,
Line 7, "an" should read -- a --;
Line 13, "$Y_{IIL}$" should read -- $Y_{HL}$ --;
Line 17, "such the" should read -- such an --.

Column 3,
Line 47, "takes" should read -- taken --.

Column 4,
Line 38, "(referred as" should read -- (referred to as an --.

Column 5,
Line 12, "laster" should read -- laser --;
Line 26, "(referred as" should read -- referred to as a --.

Column 6,
Line 15, "a" should read -- the --;
Line 19, "following" should read -- the following --;
Line 24, "such the" should read -- such --;
Line 28, "$S \leq S_{TII}$," should read -- $S \leq S_{TH,}$ --;
Line 30, "$S > S_{TII}$," should read -- $S > S_{TH,}$ --;
Line 50, "$Y_{IIL} = Y_{255'}$ (where $Y_{255'} \equiv 255$)" should read -- $Y_{HL} = Y_{255'}$ (where $Y_{255'} \cong 255$) --; and
Line 54, "$Y_{0'=0}$)" should read -- $Y_{0'} \cong 0$) --.

Column 7,
Line 23, "the," should read -- the --; and
Line 55, ""T'."" should read -- "T." --.

UNITED STATES PATENT AND TRADEMARK OFFICE
CERTIFICATE OF CORRECTION

PATENT NO. : 6,608,926 B1
DATED : August 19, 2003
INVENTOR(S) : Tetsuya Suwa et al.

It is certified that error appears in the above-identified patent and that said Letters Patent is hereby corrected as shown below:

Column 8,
Line 11, "the" should read -- an --, and "by" should read -- by the --;
Line 54, "are" should read -- is --; and
Line 62, "are" should read -- is --.

Column 9,
Line 1, "$N_{TII}$" should read -- $N_{TH}$ --;
Line 27, "$P_{IIEM}$" should read -- $P_{HEM}$ --;
Line 56, "such the" should read -- such an --; and
Line 59, "such the" should read -- such an --.

Column 10,
Lines 1 and 4, "$N_{TII}$" should read -- $N_{TH}$ --;
Lines 44 and 49, "such the" should read -- such --.

Column 11,
Line 60, "such the" should read -- such --.

Column 12,
Line 44, "step" should read -- steps --.

Signed and Sealed this

Twenty-seventh Day of July, 2004

JON W. DUDAS
*Acting Director of the United States Patent and Trademark Office*